(12) United States Patent
Okai et al.

(10) Patent No.: US 7,875,363 B2
(45) Date of Patent: Jan. 25, 2011

(54) SURFACE-TREATED STEEL SHEET

(75) Inventors: Kazuhisa Okai, Hiroshima (JP); Etsuo Hamada, Kanagawa (JP); Syuji Nomura, Hiroshima (JP)

(73) Assignee: JFE Steel Corporation, Tokyo (JP)

( * ) Notice: Subject to any disclaimer, the term of this patent is extended or adjusted under 35 U.S.C. 154(b) by 306 days.

(21) Appl. No.: 11/991,867

(22) PCT Filed: Nov. 28, 2006

(86) PCT No.: PCT/JP2006/324141

§ 371 (c)(1),
(2), (4) Date: Mar. 11, 2008

(87) PCT Pub. No.: WO2007/064008

PCT Pub. Date: Jun. 7, 2007

(65) Prior Publication Data

US 2009/0274926 A1  Nov. 5, 2009

(30) Foreign Application Priority Data

Nov. 30, 2005 (JP) ............................ 2005-347114

(51) Int. Cl.
*B05D 3/00* (2006.01)
*B05D 3/02* (2006.01)
*B32B 15/08* (2006.01)
*B32B 15/095* (2006.01)
*B32B 15/18* (2006.01)

(52) U.S. Cl. .................. 428/626; 428/659; 428/336; 427/388.1; 427/384; 427/385.5

(58) Field of Classification Search ................. 428/624, 428/626, 658, 659, 683, 684, 685, 336
See application file for complete search history.

(56) References Cited

U.S. PATENT DOCUMENTS

| 2003/0213533 A1 | 11/2003 | Sako et al. |
| 2004/0167266 A1 | 8/2004 | Hasegawa et al. |

FOREIGN PATENT DOCUMENTS

| JP | 63-189445 A | | 8/1988 |
| JP | 05-043777 A | | 2/1993 |
| JP | 2000-263695 A | | 9/2000 |
| JP | 2001-181860 A | | 7/2001 |
| JP | 2003-013252 A | | 1/2003 |
| JP | 3405260 B2 | | 3/2003 |
| JP | 2003-105562 A | | 4/2003 |
| JP | 2004-018887 | * | 1/2004 |

OTHER PUBLICATIONS

Machine Translation, Tanaka et al., JP 2004-018887, Jan. 2004.*
English-language translation of Notice of Rejection in JP 2005-347114, (dated Aug. 2009).
English-language translation of applicants' Written Opinion in JP 2005-347114.

\* cited by examiner

*Primary Examiner*—Michael La Villa
(74) *Attorney, Agent, or Firm*—Holtz, Holtz, Goodman & Chick, P.C.

(57) ABSTRACT

A surface-treated galvanized steel sheet includes a steel sheet, a zinc coating disposed on the steel sheet, and a film disposed on the zinc coating. The film has a thickness in the range of 0.01 to 3 μm and contains certain amounts of resin compound having a particular chemical structure, cationic urethane resin, vanadium compound, zirconium compound, compound having a phosphate group, and acid compound. The surface-treated galvanized steel sheet contains no hexavalent chromium in the film and is excellent in terms of corrosion resistance, alkali resistance, and solvent resistance.

3 Claims, No Drawings

SURFACE-TREATED STEEL SHEET

This application is the U.S. national phase application of International Application PCT/JP2006/324141 filed Nov. 28, 2006.

TECHNICAL FIELD

The present invention relates to an environmentally benign, surface-treated, galvanized steel sheet that is free from hexavalent chromium and is most suitable for automobiles, household electrical appliances, and construction materials.

BACKGROUND ART

Steel sheets for use in household electrical appliances, construction materials, and automobiles are mainly galvanized steel sheets. The galvanized steel sheets are treated with a liquid mainly composed of chromic acid, dichromic acid, or a salt thereof to prevent white rust and red rust. This chromate treatment provides high corrosion resistance, is inexpensive, and is not complicated in terms of controllability, such as operability. The chromate treatment therefore is widely used. However, because the chromate treatment involves the use of a regulated substance, hexavalent chromium, the application of the chromate treatment has gradually been restricted.

In this situation, various techniques have been proposed to prevent white rust in a galvanized steel sheet without using hexavalent chromium, as described, for example, in Japanese Examined Patent Application Publication No. 3405260 and Japanese Unexamined Patent Application Publication Nos. 2001-181860, 2003-13252, and 2003-105562.

In these techniques, a metallic compound for preventing rust or a resin that can form a dense film retarding the permeation of corrosive factors, such as oxygen, water, and salts are selected.

When surface-treated, galvanized steel sheets are used in the applications described above, alkaline detergents are used to remove lubricating oil used during processing and deposited foreign matter. In particular, strong alkaline degreasing solutions are being increasingly used to remove lubricating oil in a short time and thereby increase production efficiency. Furthermore, organic solvents, such as alcohols and ketones, are sometimes used to remove deposited foreign matter after processing or to erase oil-based or water-based markings on processed products. Furthermore, when a consumer uses a household electrical appliance, an oil stain or dust mars the appearance over time. Thus, a cleaning liquid containing an organic solvent or an alkaline cleaning liquid containing a detergent is sometimes used to remove the oil stain or the dust.

In this situation, a surface-treated film of a plated steel sheet must have resistance to an alkaline solution or an organic solvent (alkali resistance or solvent resistance). Low resistance may result in dissolution or abrasion of the surface-treated film. Such damage to the surface-treated film causes a decrease in corrosion resistance during long-term use, thus resulting in inferior quality. Furthermore, the elution of a component from the surface-treated film to the organic solvent causes whitening and unevenness, thus resulting in a nonuniform appearance and poor design.

However, in known techniques, including those described in the four patent documents, in which no chromate is used, a surface-treated galvanized steel sheet cannot simultaneously have corrosion resistance, alkali resistance, and solvent resistance, as well as long-term high corrosion resistance. Hence, there is a strong demand for a surface-treated galvanized steel sheet that is treated without using chromate and is excellent in terms of corrosion resistance, alkali resistance, and solvent resistance.

Accordingly, it is an object of the present invention to solve the problems of the related art and provide a surface-treated galvanized steel sheet that is free from hexavalent chromium and is excellent in terms of corrosion resistance, alkali resistance, and solvent resistance.

DISCLOSURE OF INVENTION

The present invention provides a surface-treated galvanized steel sheet, including a steel sheet, a zinc coating disposed on the steel sheet, and a film disposed on the zinc coating, the film having a thickness in the range of 0.01 to 3 μm and containing a resin compound (A) represented by a general formula (I) and a cationic urethane resin (B) at an A:B mass ratio of from 7:3 to 4:6, 2% to 20% by mass of vanadium compound (C), 2% to 20% by mass of zirconium compound (D), 5% to 30% by mass of compound (E) having a phosphate group, and 0.1% to 5% by mass of at least one acid compound (F) selected from the group consisting of hydrofluoric acid, acetic acid, nitric acid, sulfuric acid, and salts thereof, on the basis of the total amount of A and B.

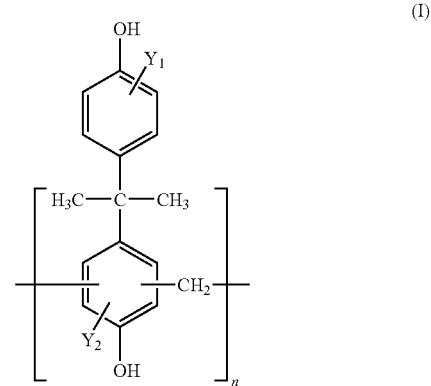

wherein $Y_1$ and $Y_2$ on benzene rings independently represent hydrogen or a Z group represented by a general formula (II) or (III), and the mean number of substituent Z groups per benzene ring is in the range of 0.2 to 1.0. n is an integer in the range of 2 to 50.

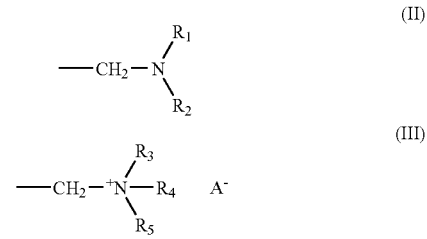

wherein $R_1$, $R_2$, $R_3$, $R_4$, and $R_5$ independently represent an hydrogen atom, an alkyl group having 1 to 10 carbon atoms, or a hydroxyalkyl group having 1 to 10 carbon atoms, and $A^-$ represents a hydroxide ion or an acid ion.

The present invention also provides a method for manufacturing the surface-treated galvanized steel sheet described above, including applying a surface treating agent to a galvanized steel sheet and drying the surface treating agent to form a film having a thickness in the range of 0.01 to 3 µm. The surface treating agent contains a resin compound (A) represented by a general formula (I) and a cationic urethane resin (B) at an A:B mass ratio of from 7:3 to 4:6, and 2% to 20% by mass of vanadium compound (C), 2% to 20% by mass of zirconium compound (D), 5% to 30% by mass of compound (E) having a phosphate group, and 0.1% to 5% by mass of at least one acid compound (F) selected from the group consisting of hydrofluoric acid, acetic acid, nitric acid, sulfuric acid, and salts thereof, on the basis of the total amount of A and B.

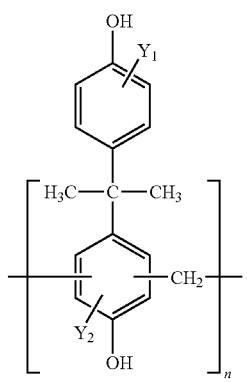

(I)

wherein $Y_1$ and $Y_2$ on benzene rings independently represent hydrogen or a Z group represented by a general formula (II) or (III), and the mean number of substituent Z groups per benzene ring is in the range of 0.2 to 1.0. n is an integer in the range of 2 to 50.

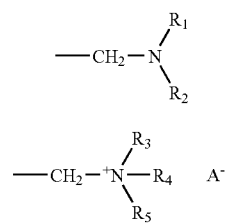

(II)

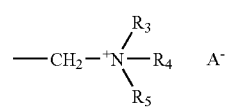

(III)

wherein $R_1$, $R_2$, $R_3$, $R_4$, and $R_5$ independently represent an hydrogen atom, an alkyl group having 1 to 10 carbon atoms, or a hydroxyalkyl group having 1 to 10 carbon atoms, and $A^-$ represents a hydroxide ion or an acid ion.

The present invention also provides a surface-treated galvanized steel sheet including a surface-treated film having a thickness in the range of 0.01 to 3 µm. The surface-treated film is formed by applying a surface treating agent to a galvanized steel sheet and drying the surface treating agent. The surface-treated film contains a resin compound (A) represented by a general formula (I), a cationic urethane resin (B) having a quaternary ammonium salt group, a vanadium compound (C), a zirconium compound (D), phosphoric acid or/and phosphate (E), and at least one acid compound (F) selected from the group consisting of hydrofluoric acid, acetic acid, nitric acid, sulfuric acid, and salts thereof. The ratio (A:B) of the resin compound (A) and the cationic urethane resin (B) is in the range of 7:3 to 4:6 on a solid basis. The vanadium compound (C) content is 2% to 20% by mass. The zirconium compound (D) content is 2% to 20% by mass. The phosphoric acid or/and phosphate (E) content is 5% to 30% by mass. The acid compound (F) content is 0.1% to 5% by mass. These contents are based on the total solid content of the resin compound (A) and the cationic urethane resin (B).

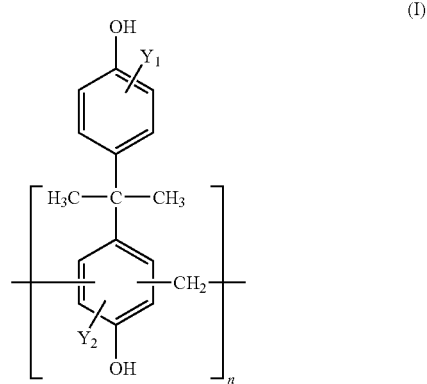

(I)

wherein $Y_1$ and $Y_2$ on benzene rings independently represent hydrogen or a Z group represented by a general formula (II) or (III), and the mean number of substituent Z groups per benzene ring is in the range of 0.2 to 1.0. n is an integer in the range of 2 to 50.

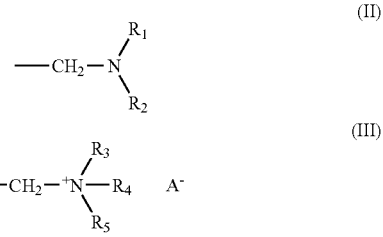

(II)

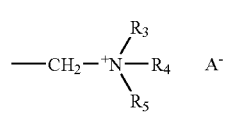

(III)

wherein $R_1$, $R_2$, $R_3$, $R_4$, and $R_5$ independently represent an hydrogen atom, an alkyl group having 1 to 10 carbon atoms, or a hydroxyalkyl group having 1 to 10 carbon atoms, and $A^-$ represents a hydroxide ion or an acid ion.

BEST MODE FOR CARRYING OUT THE INVENTION

As a consequence of diligent investigations to solve the above-mentioned problems, the present inventors found that a surface-treated galvanized steel sheet that is excellent in terms of corrosion resistance, alkali resistance, and solvent resistance can be manufactured by forming a surface-treated film on a galvanized steel sheet using a surface treating agent that contains predetermined amounts of resin compound having a particular chemical structure, urethane resin having a particular cationic functional group, vanadium compound, zirconium compound, phosphoric acid or phosphate, and particular acid compound.

Any steel sheet may be used in a surface-treated galvanized steel sheet according to the present invention.

A zinc coating according to the present invention refers to any plated coating containing zinc. Examples of the zinc coating includes an electrogalvanized coating, an electrolytic zinc-nickel alloy coating, an electrolytic zinc-cobalt alloy coating, an electrolytic zinc-iron alloy coating, a hot-dipped galvanized coating, a hot-dipped zinc alloy coating, a hot-dipped zinc-aluminum coating, a hot-dipped zinc-magnesium coating, a hot-dipped zinc-aluminum-magnesium coating, a zinc-based dispersion coating containing dispersed silica, dispersed alumina, or dispersed organic resin, and a multilayer coating containing these coating layers.

A galvanized steel sheet for use in the present invention may be plated by electrolysis (electrolysis in an aqueous solution or electrolysis in a nonaqueous solvent), a melting method, or a gas phase method. In view of productivity, including costs and facilities, hot dipping (hot-dipped steel sheet), electroplating (electroplated steel sheet), or deposition plating (deposition plated steel sheet) is preferred.

Examples of the hot-dipped steel sheet include hot-dipped galvanized steel sheets, hot-dipped zinc alloy plated steel sheets, Zn—Al alloy plated steel sheets (for example, Zn—Al (5%) alloy plated steel sheets, Zn—Al (6%)-Mg (3%) alloy plated steel sheets, and Zn—Al (11%)-Mg (3%) alloy plated steel sheets). Furthermore, a plated film may further contain at least one trace element, such as Co or Mg, to improve the corrosion resistance of these plated steel sheets.

Furthermore, examples of the electroplated steel sheet include zinc-plated steel sheets and Zn—Ni alloy plated steel sheets. Furthermore, plated films of these plated steel sheets may contain a trace amount of at least one element selected from the group consisting of Ni, Co, Pb, Sn, and Fe.

Furthermore, to prevent a plated coating from turning black at high temperature and high humidity, about 1 to 2000 ppm of at least one element selected from the group consisting of Ni, Co, and Fe may be precipitated in the plated coating, or the plated coating may be finished with an aqueous alkali or an aqueous acid each containing at least one element selected from the group consisting of Ni, Co, and Fe to precipitate the element(s).

In a surface-treated galvanized steel sheet according to the present invention, the surface of the galvanized steel sheet contains predetermined amounts of particular resin compound (A), cationic urethane resin (B), vanadium compound (C), zirconium compound (D), compound (E) having a phosphate group, and at least one acid compound (F) selected from the group consisting of hydrofluoric acid, acetic acid, nitric acid, sulfuric acid, and salts thereof. In this surface-treated galvanized steel sheet, a surface treating agent (surface treating composition) containing predetermined amounts of (A) to (F) is applied and is dried to form a surface-treated film having a predetermined thickness. The surface-treated film is free from hexavalent chromium. The term "compound having a phosphate group" refers to at least one compound selected from the group consisting of phosphoric acid and phosphate and is also herein referred to as "phosphoric acid or/and phosphate".

The resin compound (A) in the surface treating agent (surface treating composition) imparts corrosion resistance and has a chemical structure represented by a general formula (I):

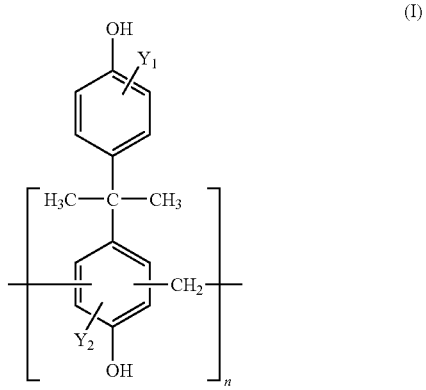

wherein $Y_1$ and $Y_2$ on benzene rings independently represent hydrogen or a Z group represented by a general formula (II) or (III), and the mean number of substituent Z groups per benzene ring is in the range of 0.2 to 1.0. n is an integer in the range of 2 to 50.

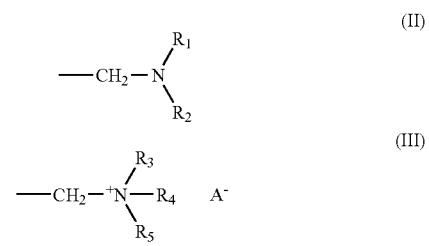

wherein $R_1$, $R_2$, $R_3$, $R_4$, and $R_5$ independently represent an hydrogen atom, an alkyl group having 1 to 10 carbon atoms, or a hydroxyalkyl group having 1 to 10 carbon atoms, and $A^-$ represents a hydroxide ion or an acid ion.

In the general formula (I), the mean number of substituent Z groups is calculated by dividing the total number of Z groups by the number of benzene rings (that is, 2n). When the mean number of substituent Z groups is less than 0.2, the storage stability of the surface treating agent is insufficient. When the mean number of substituent Z groups is more than 1.0, the water resistance of the surface-treated film decreases, and accordingly the effect of inhibiting white rust also decreases. n represents the average degree of polymerization. When n is less than 2, the surface-treated film is poor in terms of barrier effect, corrosion resistance, and alkali resistance. When n is more than 50, the resin compound (A) becomes less soluble in water and increases in viscosity. Thus, the resin compound (A) becomes less stable in the surface treating agent, and the storage stability of the surface treating agent becomes insufficient.

In the general formulae (II) and (III), when the number of carbon atoms in an alkyl group or a hydroxyalkyl group is more than 10, the resin compound (A) becomes less soluble in water and becomes less stable in the surface treating agent. The resin compound (A) therefore cannot be used in the surface treating agent. Specific examples of $R_1$, $R_2$, $R_3$, $R_4$, and $R_5$ include methyl, ethyl, propyl, butyl, hydroxyethyl, 2-hydroxypropyl, and hydroxyisobutyl. Specific examples of the acid ion $A^-$ include a sulfate ion, a nitrate ion, an acetate ion, a fluoride ion, and a phosphate ion.

The resin compound (A) represented by the general formula (I) is a bisphenol-formalin condensation product. The bisphenol-formalin condensation product may be synthesized by any method. For example, the bisphenol-formalin condensation product may be synthesized by the reaction of bisphenol A, formalin, and an amine in the presence of an alkaline catalyst.

The cationic urethane resin (B) in the surface treating agent (surface treating composition) may be any urethane resin having a quaternary ammonium salt portion. The cationic urethane resin (B) may be composed of any monomer components, that is, any polyol and any isocyanate, and may be synthesized by any method. The quaternary ammonium salt portion is also herein referred to as a quaternary ammonium salt group, which serves as a cationic functional group. The quaternary ammonium salt group may be any quaternary ammonium salt of an amino group, a methylamino group, an ethylamino group, a dimethylamino group, a diethylamino group, a trimethylamino group, or a triethylamino group, provided that the performance of the present invention is not compromised. Examples of a counter ion necessary to stabilize the quaternary ammonium salt group include a sulfate ion, a nitrate ion, an acetate ion, a fluoride ion, and a phosphate ion.

A cationic urethane resin (B) having a quaternary ammonium salt group can easily form a film. The film thus formed can have a higher density and an improved barrier property. The film can therefore retard the permeation of corrosive factors, such as water and salts, and have higher corrosion resistance. Furthermore, the film is hardly soluble in an alkaline solution and therefore has higher resistance to an alkaline solution.

The ratio (A:B) of the resin compound (A) and the cationic urethane resin (B) on a solid basis is in the range of 7:3 to 4:6 and is preferably in the range of 6:4 to 5:5. The term "ratio on a solid basis" refers to the mass ratio of the resin (A) and the resin (B).

When the ratio (A:B) is more than 7, the surface-treated film has lower alkali resistance. When the ratio (A:B) is less than 4, the surface-treated film has lower solvent resistance. The resin compound (A) has low resistance to an alkaline solution. In particular, when the film forming temperature is too low to form an appropriate film, part of the resulting film is washed away by water. This results in lower corrosion resistance after the exposure to an alkaline solution. Unlike the film only formed of the resin compound (A), a film further containing the cationic urethane resin (B) is more easily formed and therefore is hardly washed away. This can retard the occurrence of rust. In addition, the surface-treated film can retain solvent resistance and alkali resistance. When an appropriate film is formed, the resin compound (A) having benzene rings can increase the hydrophobicity of the film and thereby efficiently retards the occurrence of white rust. Since the resin compound (A) is less soluble in a polar organic solvent, such as an alcohol or a ketone, an optimum amount of resin compound (A) should be added in view of solvent resistance. Thus, the ratio described above is in the optimum range. The surface-treated film having this ratio can maintain an excellent balance of corrosion resistance, alkali resistance, and solvent resistance, and thereby achieve optimum performance.

The vanadium compound (C) in the surface treating agent (surface treating composition) can effectively reduce the occurrence of white rust in a galvanized steel sheet. The surface-treated film can therefore retain corrosion resistance for a long period of time. The vanadium compound (C) may be at least one compound selected from the group consisting of vanadium pentoxide, metavanadic acid, ammonium metavanadate, sodium metavanadate, vanadium oxytrichloride, vanadium trioxide, vanadium dioxide, vanadium sulfate, vanadyl acetylacetonate, vanadium acetylacetonate, and vanadium trichloride.

The amount of vanadium compound (C) is in the range of 2% to 20% by mass, preferably 5% to 15% by mass, on the basis of the total solid content (synonymous with mass; the same applies to the following) of the resin compound (A) and the cationic urethane resin (B). When the amount of vanadium compound (C) is less than 2% by mass, the surface-treated film has lower corrosion resistance. When the amount of vanadium compound (C) is more than 20% by mass, the surface treating agent has lower storage stability.

The zirconium compound (D) in the surface treating agent (surface treating composition) reduces the occurrence of white rust in a galvanized steel sheet. The surface-treated film can therefore retain high corrosion resistance for a long period of time.

The zirconium compound (D) may be any compound serving as a source of zirconium. Any counter anion may be used in the zirconium compound (D). The zirconium compound (D) may be at least one compound selected from the group consisting of zirconium acetate, zirconium nitrate, zirconium sulfate, zirconium phosphate, zirconium carbonate, and fluorozirconic acid.

The amount of zirconium compound (D) is in the range of 2% to 20% by mass, preferably 5% to 15% by mass, on the basis of the total solid content of the resin compound (A) and the cationic urethane resin (B). When the amount of zirconium compound (D) is less than 2% by mass, the corrosion resistance, the alkali resistance, and the solvent resistance of the surface-treated film decrease. When the amount of zirconium compound (D) is more than 20% by mass, the surface treating agent has lower storage stability.

A compound having a phosphate group, that is, phosphoric acid or/and phosphate (E), in the surface treating agent (surface treating composition) reacts with a zinc coating on a galvanized steel sheet. The resulting film can prevent the occurrence of white rust. Preferably, the phosphoric acid or/and phosphate (E) is at least one compound selected from the group consisting of phosphoric acid, pyrophosphoric acid, trimetaphosphoric acid, tetrametaphosphoric acid, hexametaphosphoric acid, polyphosphoric acid, ammonium dihydrogen phosphate, diammonium hydrogen phosphate, triammonium phosphate, sodium dihydrogen phosphate, disodium hydrogen phosphate, and trisodium phosphate.

The amount of phosphoric acid or/and phosphate (E) is in the range of 5% to 30% by mass, preferably 10% to 25% by mass, on the basis of the total solid content of the resin compound (A) and the cationic urethane resin (B). When the amount of phosphoric acid or/and phosphate (E) is less than 5% by mass, the surface-treated film has lower corrosion resistance. When the amount of phosphoric acid or/and phosphate (E) is more than 30% by mass, the surface-treated film becomes fragile and is easily washed away by water. Thus, the corrosion resistance, the alkali resistance, and the solvent resistance of the surface-treated film decrease.

The acid compound (F) in the surface treating agent (surface treating composition) may be at least one compound selected from the group consisting of inorganic acids, such as hydrofluoric acid, nitric acid, and sulfuric acid, organic acids, such as acetic acid, oxalic acid, citric acid, succinic acid, and malic acid, and salts thereof.

The acid compound (F) functions as an etchant and promotes a reaction with a zinc coating on a galvanized steel sheet. This strengthens the interface between the resulting film and the zinc coating and thereby strengthens their adhesion, making the surface of the zinc coating inactive. In terms of etching (effect), at least one acid compound selected from the group consisting of hydrofluoric acid, acetic acid, nitric acid, sulfuric acid, and salts thereof is particularly preferred. Examples of the salts include, but not limited to, ammonium salts, sodium salts, potassium salts, and lithium salts.

The amount of acid compound (F) is in the range of 0.1% to 5% by mass, preferably 0.5% to 3% by mass, on the basis of the total solid content of the resin compound (A) and the cationic urethane resin (B). When the amount of acid compound (F) is less than 0.1% by mass, the corrosion resistance, the alkali resistance, and the solvent resistance of the surface-treated film decrease. When the amount of acid compound (F) is more than 5% by mass, the surface-treated film becomes fragile and is easily washed away by water. Thus, the corrosion resistance and the alkali resistance of the surface-treated film decrease.

According to the present invention, the phosphoric acid or/and phosphate (E) react with a plated metal surface activated by the acid compound (F) to form a film adhering firmly to the plated metal. In this case, very high corrosion resistance can be achieved by the combination of the following effects: (1) part of a film insufficiently formed only of the acid compound (F) or the phosphoric acid or/and phosphate (E) is covered with a hardly soluble film formed of the vanadium compound (C) or the zirconium compound (D) and (2) a hydrophobic film easily formed from the resin compound (A) and the cationic urethane resin (B) retards the permeation of corrosive factors.

In addition to the components described above, the surface treating agent (surface treating composition) can contain an inorganic filler and/or a lubricant such as wax. Furthermore, the surface treating agent (surface treating composition) can contain a detergent and/or a solvent to control the smoothness of the surface-treated film.

Such a surface treating agent (surface treating composition) is applied and is dried to form a surface-treated film having a thickness (dry film thickness) of from 0.01 to 3 μm and preferably of from 0.1 to 2 μn. When the film thickness is less than 0.01 μm, the corrosion resistance, the alkali resistance, and the solvent resistance of the surface-treated film are insufficient. When the film thickness is more than 3 μm, the performance of the surface-treated film levels off. The film thickness, therefore, should be 3 μm or less for economical reasons.

In the surface-treated galvanized steel sheet, an organic resin film may be formed as a second layer on the surface-treated film. The organic resin film can impart fingerprint resistance and/or severe plastic deformation resistance to the surface-treated galvanized steel sheet. When the organic resin film is formed as a second layer on the surface-treated film, from the viewpoint of processability, preferably, the thickness of the organic resin film is in the range of 0.01 to 5 μm, the thickness of the surface-treated film according to the present invention, which is a first layer, is in the range of 0.01 μm to 3 μm, and the total thickness of the first layer and the second layer is 5 μm or less. More preferably, the thickness of the surface-treated film according to the present invention is in the range of 0.01 to 2 μm, the thickness of the organic resin film of the second layer is in the range of 0.01 to 3 μm, and the total thickness of the first layer and the second layer is 5 μm or less.

Examples of a resin forming the organic resin film of the second layer include epoxy resins, polyhydroxy polyether resins, acrylic copolymerization resins, ethylene-acrylic acid copolymer resins, alkyd resins, polybutadiene resins, phenolic resins, polyurethane resins, polyamine resins, and polyphenylene resins, alone or in combination thereof, and addition polymers thereof. In addition to the organic resin, the organic resin film of the second layer can contain an antirust, a lubricant, and color pigment.

Next, a method for manufacturing a surface-treated galvanized steel sheet according to the present invention is described below.

A surface-treated galvanized steel sheet according to the present invention is manufactured by applying a surface treating agent (surface treating composition) containing the components described above on a galvanized steel sheet and drying the surface treating agent by heating to form a film having a thickness described above. If necessary, the surface of the galvanized steel sheet may be degreased with an alkali before the application of the surface treating agent. Furthermore, another pretreatment such as surface finishing can be performed to improve the adhesiveness and/or the corrosion resistance.

The surface treating agent may be applied to a plated steel sheet by coating, dipping, or spraying. The coating may be performed with a roll coater (a three-roll coater, a two-roll coater, or the like), a squeeze coater, or a die coater. Furthermore, after coating with a squeeze coater, dipping, or spraying, an air knife method or a roll-squeezing method may be applied to control the coating weight and make the appearance and the thickness of the film uniform.

Heat drying after the application of the surface treating agent may be performed with a dryer, an air-heating furnace, a high-frequency induction furnace, or an infrared furnace. The heat treatment may suitably be performed at a temperature of 40° C. to 250° C., preferably of 50° C. to 200° C., and more preferably of 60° C. to 150° C. When the heating temperature is more than 250° C., the film turns yellow. This is not preferable in terms of design. Furthermore, the film may be damaged and thereby have lower corrosion resistance.

When an organic resin film is formed as a second layer on the surface-treated film, a treating composition for the second layer is applied to the surface-treated film and is dried to form a film having a thickness described above. The application of the treating composition and the heat drying may be performed in the same way as described for the formation of the surface treatment.

EXAMPLES

Each of resin compounds A (Table 1), cationic organic resins (Table 2), vanadium compounds (Table 3), zirconium compounds (Table 4), phosphoric acids or/and phosphate (Table 5), and acid compounds (Table 6) was appropriately added to deionized water with stirring to prepare a surface treating agent for forming a surface-treated film. Each of the surface treating agent contained 15% by mass (solid contents) of the respective components in total.

Plated steel sheet materials were galvanized steel sheets as shown in Table 7. Each plated steel sheet was degreased with an alkaline solution at a spray pressure of 0.5 kg/cm² for 15 seconds, was washed in tap water, and was dried with cool air to clean the surface. The alkaline degreasing solution was about 2% solution of "CL-N364S" (Nihon Parkerizing Co., Ltd.) in tap water.

Each of the surface treating agents was applied to the cleaned surface of a galvanized steel sheet and was dried by heating at a predetermined temperature to prepare surface-treated galvanized steel sheets according to the examples and the comparative examples. The thickness of the surface treating agent applied to a galvanized steel sheet was adjusted to a predetermined dry thickness by diluting with deionized water or changing its wet amount in a roll coater.

The surface-treated galvanized steel sheets thus prepared were subjected to the following tests to evaluate the appearance of a film, corrosion resistance, alkali resistance, and solvent resistance.

(1) Film Appearance

Uniformity of film appearance was visually evaluated. The evaluation criteria were as follows:

○: uniform appearance without unevenness,

○-: slight and almost incognizable unevenness,

Δ: some unevenness, and

X: much unevenness.

(2) Corrosion Resistance (2-1) Salt Spray Test (SST)

The surface-treated galvanized steel sheets were subjected to a salt spray test (SST) (JIS-Z-2371). The percentage of white rust area was evaluated after 240 hours. The evaluation criteria were as follows:

○: the percentage of white rust area was less than 5%,

○-: the percentage of white rust area was in the range of 5% to 10%,

Δ: the percentage of white rust area was in the range of 10% to 25%, and

X: the percentage of white rust area was 25% or more.

(2-2) Combined Cyclic Test (CCT)

The surface-treated galvanized steel sheets were subjected to a combined cyclic test (CCT) under the conditions described below and were evaluated for the percentage of white rust area after six cycles. The evaluation criteria were the same as the salt spray test.

Combined cyclic test conditions: one cycle included salt spray→drying→wetting. Each process was performed under the following conditions.

Salt spray: 35° C.±1° C., 5%±0.5% NaCl, two hours.
Drying: 60° C.±1° C., 20-30% RH, four hours.
Wetting: 50° C.±1° C., >95% RH, two hours.

(3) Alkali Resistance

The surface-treated galvanized steel sheets were treated with an alkaline degreasing solution, which was 2% "CL-N364S" (Nihon Parkerizing Co., Ltd.) in tap water, at 65° C. for six minutes at a spray pressure of 0.5 kg/cm². The surface-treated galvanized steel sheets were subsequently washed in tap water and were dried with cool air. The surface-treated galvanized steel sheets were then subjected to a salt spray test (SST) (JIS-Z-2371). The percentage of white rust area was evaluated after 168 hours. The evaluation criteria were as follows:

○: the percentage of white rust area was less than 5%,

○-: the percentage of white rust area was in the range of 5% to 10%,

Δ: the percentage of white rust area was in the range of 10% to 25%, and

X: the percentage of white rust area was 25% or more.

(4) Solvent Resistance (4-1) Change in Appearance

The surface-treated galvanized steel sheets were rubbed back and forth for 20 times at a load of about 1 kg with "Kimwipes S200" (Nippon Paper Crecia Co., Ltd.) impregnated with an organic solvent. The organic solvent was ethanol, methyl ethyl ketone (MEK), hexane, or benzene. After natural drying, the film appearance was visually evaluated. The evaluation criteria were as follows:

○: no change in appearance and uniform appearance,

○-: slight and almost incognizable change in appearance,

Δ: change in appearance and nonuniform appearance, and

X: large change in appearance and partial abrasion at an interface between a plated surface and a film.

(4-2) Corrosion Resistance

After the change in appearance was evaluated with the organic solvents in the section (4-1), the surface-treated galvanized steel sheets were subjected to a salt spray test (JIS-Z-2371). The percentage of white rust area was evaluated after 168 hours. The evaluation criteria were as follows:

○: the percentage of white rust area was less than 5%,

○-: the percentage of white rust area was in the range of 5% to 10%,

Δ: the percentage of white rust area was in the range of 10% to 25%, and

X: the percentage of white rust area was 25% or more.

Tables 8 to 10 summarize the structures of the surface-treated galvanized steel sheets (compositions of surface treating agents and film thicknesses) according to the examples and the comparative examples. Tables 11 to 13 summarize the results of the evaluation tests. These results showed that the example Nos. 1 to 3, 8 to 11, 14 to 17, 20 to 24, 27 to 29, 32 to 37, and 39 to 44 were excellent in terms of the film appearance, the corrosion resistance, the alkali resistance, and the solvent resistance. In contrast, the comparative example Nos. 4 to 7, 12, 13, 18, 19, 25, 26, 30, and 31, in which the surface treating agent compositions do not satisfy the conditions according to the present invention, were poor in terms of at least one of the corrosion resistance, the alkali resistance, and the solvent resistance. Furthermore, the comparative example No. 38 having a small thickness was poor in terms of the alkali resistance, the corrosion resistance, and the solvent resistance. The comparative example Nos. 45 and 46, in which the cationic urethane resin (B) was replaced by a cationic acrylic resin or a cationic epoxy resin, were poor in terms of the corrosion resistance, the alkali resistance, and the solvent resistance.

In Tables 8 to 10,

*1 refers to the resin compound No. shown in Table 1,

*2 refers to the cationic organic resin No. shown in Table 2,

*3 refers to the vanadium compound No. shown in Table 3,

*4 refers to the zirconium compound No. shown in Table 4,

*5 refers to the phosphoric acid or phosphate No. shown in Table. 5,

*6 refers to the acid compound No. shown in Table. 6,

*7 refers to the plated steel sheet No. shown in Table. 7, and

*8 refers to the composition expressed in parts by mass (for "Resin compound (A)" and "Urethane resin (B) etc.,"*8 refers to the solid content expressed in parts by mass).

TABLE 1

| | Z group *1 | | | | Mean number | |
| | $Y_1$ | | $Y_2$ | | of substituent | |
| No. | $R_1$ | $R_2$ | $R_1$ | $R_2$ | Z groups | n |
| --- | --- | --- | --- | --- | --- | --- |
| 1 | Hydrogen | Hydrogen | Methyl | Ethyl | 0.4 | 5 |
| 2 | Ethyl | Methyl | Hydrogen | Propyl | 0.7 | 3 |
| 3 | Ethyl | Propyl | Hydrogen | Ethyl | 0.4 | 8 |

*1 A Z group is represented by a general formula (II).

TABLE 2

| No. | Resin type | Trade name | Conditions according to the present invention |
|---|---|---|---|
| 1 | Cationic urethane resin | ADEKA bontiter HUX-670 (ADEKA CORPORATION) | Satisfied |
| 2 | Cationic urethane resin | Superflex 600 (Dai-ichi Kogyo Seiyaku Co., Ltd.) | Satisfied |
| 3 | Cationic acrylic resin | Kanebinol KD21 (Nippon NSC Ltd.) | Not satisfied |
| 4 | Cationic epoxy resin | ADEKA Resin EPEC-0436 (ADEKA CORPORATION) | Not satisfied |

TABLE 3

| No. | Compound |
|---|---|
| 1 | Vanadium acetylacetonate |
| 2 | Sodium metavanadate |
| 3 | Vanadium sulfate |
| 4 | Vanadium phosphate |

TABLE 4

| No. | Compound |
|---|---|
| 1 | Fluorozirconic acid |
| 2 | Zirconium acetate |
| 3 | Zirconium nitrate |
| 4 | Zirconium phosphate |

TABLE 5

| No. | Compound |
|---|---|
| 1 | Phosphoric acid |
| 2 | Triammonium phosphate |
| 3 | Pyrophosphoric acid |
| 4 | Polyphosphoric acid |

TABLE 6

| No. | Compound |
|---|---|
| 1 | Hydrofluoric acid |
| 2 | Acetic acid |
| 3 | Nitric acid |
| 4 | Sulfuric acid |

TABLE 7

| No. | Compound | Plated coat (g/m$^2$) |
|---|---|---|
| 1 | Hot-dipped galvanized steel sheet | 60 |
| 2 | Electrogalvanized steel sheet | 20 |
| 3 | Hot-dipped Al (5% by mass)—Zn coated steel sheet | 90 |
| 4 | Hot-dipped Al (6% by mass)—Mg (3% by mass)—Zn coated steel sheet | 120 |

TABLES 8

| Example or Comparative example | No. | Plated steel sheet *7 | Resin compound (A) Type *1 | Amount | Urethane resin (B) etc. Type *2 | Amount | Vanadium compound (C) Type *3 | Amount | Zirconium compound (D) Type *4 | Amount | Phosphoric acid or phosphate (E) Type *5 | Amount | Acid compound (F) Type *6 | Amount | Film thickness (μm) | Baking temperature (° C.) |
|---|---|---|---|---|---|---|---|---|---|---|---|---|---|---|---|---|
| Example | 1 | 1 | 1 | 40 | 1 | 60 | 1 | 7 | 1 | 7 | 1 | 20 | 1 | 2 | 1.0 | 100 |
| Example | 2 | 1 | 2 | 50 | 1 | 50 | 1 | 7 | 1 | 7 | 1 | 20 | 1 | 2 | 1.0 | 100 |
| Example | 3 | 1 | 3 | 70 | 2 | 30 | 1 | 7 | 1 | 7 | 1 | 20 | 1 | 2 | 1.0 | 100 |
| Comparative example | 4 | 1 | 1 | 90 | 1 | 10 | 1 | 7 | 1 | 7 | 1 | 7 | 1 | 2 | 1.0 | 100 |
| Comparative example | 5 | 1 | 1 | 30 | 1 | 70 | 1 | 7 | 1 | 7 | 1 | 7 | 1 | 2 | 1.0 | 100 |
| Comparative example | 6 | 1 | — | 0 | 1 | 100 | 1 | 7 | 1 | 7 | 1 | 20 | 1 | 2 | 1.0 | 100 |
| Comparative example | 7 | 1 | 1 | 100 | — | 0 | 1 | 7 | 1 | 7 | 1 | 20 | 1 | 2 | 1.0 | 100 |
| Example | 8 | 1 | 1 | 50 | 1 | 50 | 2 | 2 | 1 | 7 | 1 | 20 | 1 | 2 | 1.0 | 100 |
| Example | 9 | 1 | 1 | 50 | 1 | 50 | 3 | 7 | 1 | 7 | 1 | 20 | 1 | 2 | 1.0 | 100 |
| Example | 10 | 1 | 1 | 50 | 1 | 50 | 4 | 12 | 1 | 7 | 1 | 20 | 1 | 2 | 1.0 | 100 |
| Example | 11 | 1 | 1 | 50 | 1 | 50 | 1 | 20 | 1 | 7 | 1 | 20 | 1 | 2 | 1.0 | 100 |

TABLES 8-continued

| Example or Comparative example | No. | Plated steel sheet *7 | Composition of surface treating agent *8 ||||||||||||| Film thickness (μm) | Baking temperature (°C.) |
| | | | Resin compound (A) || Urethane resin (B) etc. || Vanadium compound (C) || Zirconium compound (D) || Phosphoric acid or phosphate (E) || Acid compound (F) || | |
| | | | Type *1 | Amount | Type *2 | Amount | Type *3 | Amount | Type *4 | Amount | Type *5 | Amount | Type *6 | Amount | | |
| Comparative example | 12 | 1 | 1 | 50 | 1 | 50 | 1 | 0.5 | 1 | 7 | 1 | 7 | 1 | 2 | 1.0 | 100 |
| Comparative example | 13 | 1 | 1 | 50 | 1 | 50 | — | 0 | 1 | 7 | 1 | 20 | 1 | 2 | 1.0 | 100 |
| Example | 14 | 1 | 1 | 50 | 1 | 50 | 1 | 7 | 2 | 2 | 1 | 20 | 1 | 2 | 1.0 | 100 |
| Example | 15 | 1 | 1 | 50 | 1 | 50 | 1 | 7 | 3 | 7 | 1 | 20 | 1 | 2 | 1.0 | 100 |
| Example | 16 | 1 | 1 | 50 | 1 | 50 | 1 | 7 | 4 | 12 | 1 | 20 | 1 | 2 | 1.0 | 100 |

TABLES 9

| Example or Comparative example | No. | Plated steel sheet *7 | Composition of surface treating agent *8 ||||||||||||| Film thickness (μm) | Baking temperature (°C.) |
| | | | Resin compound (A) || Urethane resin (B) etc. || Vanadium compound (C) || Zirconium compound (D) || Phosphoric acid or phosphate (E) || Acid compound (F) || | |
| | | | Type *1 | Amount | Type *2 | Amount | Type *3 | Amount | Type *4 | Amount | Type *5 | Amount | Type *6 | Amount | | |
| Example | 17 | 1 | 1 | 50 | 1 | 50 | 1 | 7 | 1 | 20 | 1 | 20 | 1 | 2 | 1.0 | 100 |
| Comparative example | 18 | 1 | 1 | 50 | 1 | 50 | 1 | 7 | 1 | 0.5 | 1 | 7 | 1 | 2 | 1.0 | 100 |
| Comparative example | 19 | 1 | 2 | 50 | 1 | 50 | 1 | 7 | — | 0 | 1 | 20 | 1 | 2 | 1.0 | 100 |
| Example | 20 | 1 | 1 | 50 | 1 | 50 | 1 | 7 | 1 | 7 | 2 | 5 | 1 | 2 | 1.0 | 100 |
| Example | 21 | 1 | 1 | 50 | 1 | 50 | 1 | 7 | 1 | 7 | 3 | 10 | 1 | 2 | 1.0 | 100 |
| Example | 22 | 1 | 1 | 50 | 1 | 50 | 1 | 7 | 1 | 7 | 4 | 20 | 1 | 2 | 1.0 | 100 |
| Example | 23 | 1 | 1 | 50 | 1 | 50 | 1 | 7 | 1 | 7 | 1 | 20 | 1 | 2 | 1.0 | 100 |
| Example | 24 | 1 | 1 | 50 | 1 | 50 | 1 | 7 | 1 | 7 | 1 | 30 | 1 | 2 | 1.0 | 100 |
| Comparative example | 25 | 1 | 1 | 50 | 1 | 50 | 1 | 7 | 1 | 7 | 1 | 40 | 1 | 2 | 1.0 | 100 |
| Comparative example | 26 | 1 | 2 | 50 | 1 | 50 | 1 | 7 | 1 | 7 | — | 0 | 1 | 2 | 1.0 | 100 |
| Example | 27 | 1 | 1 | 50 | 1 | 50 | 1 | 7 | 1 | 7 | 1 | 20 | 2 | 0.1 | 1.0 | 100 |
| Example | 28 | 1 | 1 | 50 | 1 | 50 | 1 | 7 | 1 | 7 | 1 | 20 | 3 | 1 | 1.0 | 100 |
| Example | 29 | 1 | 1 | 50 | 1 | 50 | 1 | 7 | 1 | 7 | 1 | 20 | 4 | 5 | 1.0 | 100 |
| Comparative example | 30 | 1 | 1 | 50 | 1 | 50 | 1 | 7 | 1 | 7 | 1 | 20 | 1 | 0.02 | 1.0 | 100 |
| Comparative example | 31 | 1 | 1 | 50 | 1 | 50 | 1 | 7 | 1 | 7 | 1 | 20 | — | 0 | 1.0 | 100 |

TABLES 10

| Example or Comparative example | No. | Plated steel sheet *7 | Composition of surface treating agent *8 ||||||||||||| Film thickness (μm) | Baking temperature (°C.) |
| | | | Resin compound (A) || Urethane resin (B) etc. || Vanadium compound (C) || Zirconium compound (D) || Phosphoric acid or phosphate (E) || Acid compound (F) || | |
| | | | Type *1 | Amount | Type *2 | Amount | Type *3 | Amount | Type *4 | Amount | Type *5 | Amount | Type *6 | Amount | | |
| Example | 32 | 2 | 1 | 50 | 1 | 50 | 1 | 7 | 1 | 7 | 1 | 20 | 1 | 2 | 1.0 | 100 |
| Example | 33 | 3 | 1 | 50 | 1 | 50 | 1 | 7 | 1 | 7 | 1 | 20 | 1 | 2 | 1.0 | 100 |
| Example | 34 | 4 | 1 | 50 | 1 | 50 | 1 | 7 | 1 | 7 | 1 | 20 | 1 | 2 | 1.0 | 100 |
| Example | 35 | 1 | 1 | 50 | 1 | 50 | 1 | 7 | 1 | 7 | 1 | 20 | 1 | 2 | 0.01 | 100 |
| Example | 36 | 1 | 1 | 50 | 1 | 50 | 1 | 7 | 1 | 7 | 1 | 20 | 1 | 2 | 0.1 | 100 |
| Example | 37 | 1 | 1 | 50 | 1 | 50 | 1 | 7 | 1 | 7 | 1 | 20 | 1 | 2 | 2.0 | 100 |
| Comparative example | 38 | 1 | 1 | 50 | 1 | 50 | 1 | 7 | 1 | 7 | 1 | 20 | 1 | 2 | 0.005 | 100 |
| Example | 39 | 1 | 1 | 50 | 1 | 50 | 1 | 7 | 1 | 7 | 1 | 20 | 1 | 2 | 1.0 | 25 |
| Example | 40 | 1 | 1 | 50 | 1 | 50 | 1 | 7 | 1 | 7 | 1 | 20 | 1 | 2 | 1.0 | 40 |
| Example | 41 | 1 | 1 | 50 | 1 | 50 | 1 | 7 | 1 | 7 | 1 | 20 | 1 | 2 | 1.0 | 80 |
| Example | 42 | 1 | 1 | 50 | 1 | 50 | 1 | 7 | 1 | 7 | 1 | 20 | 1 | 2 | 1.0 | 180 |
| Example | 43 | 1 | 1 | 50 | 1 | 50 | 1 | 7 | 1 | 7 | 1 | 20 | 1 | 2 | 1.0 | 250 |

TABLES 10-continued

| | | Composition of surface treating agent *8 | | | | | | | | | | | | |
|---|---|---|---|---|---|---|---|---|---|---|---|---|---|---|
| Example or Comparative example | Plated steel sheet *7 | Resin compound (A) | | Urethane resin (B) etc. | | Vanadium compound (C) | | Zirconium compound (D) | | Phosphoric acid or phosphate (E) | | Acid compound (F) | | Film thickness (μm) | Baking temperature (° C.) |
| | No. | Type *1 | Amount | Type *2 | Amount | Type *3 | Amount | Type *4 | Amount | Type *5 | Amount | Type *6 | Amount | | |
| Example | 44 | 1 | 50 | 1 | 50 | 1 | 7 | 1 | 7 | 1 | 20 | 1 | 2 | 1.0 | 300 |
| Comparative example | 45 | 1 | 50 | 3 | 50 | 1 | 7 | 1 | 7 | 1 | 20 | 1 | 2 | 1.0 | 100 |
| Comparative example | 46 | 1 | 50 | 4 | 50 | 1 | 7 | 1 | 7 | 1 | 20 | 1 | 2 | 1.0 | 100 |

TABLES 11

| Example or Comparative example | No. | Film appearance | Corrosion resistance | | Alkali resistance | Solvent resistance | | | | | | | |
|---|---|---|---|---|---|---|---|---|---|---|---|---|---|
| | | | | | | Appearance | | | | Corrosion resistance | | | |
| | | | SST | CCT | | Ethanol | MEK | Hexane | Benzene | Ethanol | MEK | Hexane | Benzene |
| Example | 1 | ○ | ○ | ○- | ○ | ○ | ○ | ○ | ○ | ○ | ○ | ○ | ○ |
| Example | 2 | ○ | ⊚ | ○ | ⊚ | ○ | ○ | ○ | ○ | ⊚ | ⊚ | ⊚ | ⊚ |
| Example | 3 | ○ | ○ | ○ | ○ | ○ | ○ | ○ | ○ | ○ | ○ | ○ | ○ |
| Comparative example | 4 | ○ | ○- | △ | × | ○ | ○ | ○ | ○ | ○- | ○- | ○- | ○- |
| Comparative example | 5 | ○ | △ | × | △ | × | △ | ○ | ○ | △ | △ | △ | △ |
| Comparative example | 6 | ○ | × | × | × | × | × | ○ | ○ | × | × | × | × |
| Comparative example | 7 | ○ | × | × | × | ○ | ○ | ○- | △ | × | × | × | × |
| Example | 8 | ○ | ○ | ○- | ○ | ○ | ○ | ○ | ○ | ○ | ○ | ○ | ○ |
| Example | 9 | ○ | ⊚ | ⊚ | ⊚ | ○ | ○ | ○ | ○ | ⊚ | ⊚ | ⊚ | ⊚ |
| Example | 10 | ○ | ⊚ | ⊚ | ⊚ | ○ | ○ | ○ | ○ | ⊚ | ⊚ | ⊚ | ⊚ |
| Example | 11 | ○ | ○ | ○ | ○ | ○ | ○ | ○ | ○ | ○ | ○ | ○ | ○ |
| Comparative example | 12 | ○ | ○- | × | ○- | ○ | ○ | ○ | ○ | ○- | ○- | ○- | ○- |
| Comparative example | 13 | ○ | △ | × | × | ○ | ○ | ○ | ○ | △ | △ | △ | △ |
| Example | 14 | ○ | ○ | ○ | ○- | ○ | ○ | ○ | ○ | ○ | ○ | ○ | ○ |
| Example | 15 | ○ | ⊚ | ⊚ | ⊚ | ○ | ○ | ○ | ○ | ⊚ | ⊚ | ⊚ | ⊚ |
| Example | 16 | ○ | ⊚ | ⊚ | ⊚ | ○ | ○ | ○ | ○ | ⊚ | ⊚ | ⊚ | ⊚ |

TABLES 12

| Example or Comparative example | No. | Film appearance | Corrosion resistance | | Alkali resistance | Solvent resistance | | | | | | | |
|---|---|---|---|---|---|---|---|---|---|---|---|---|---|
| | | | | | | Appearance | | | | Corrosion resistance | | | |
| | | | SST | CCT | | Ethanol | MEK | Hexane | Benzene | Ethanol | MEK | Hexane | Benzene |
| Example | 17 | ○ | ○ | ○ | ○ | ○ | ○ | ○ | ○ | ○ | ○ | ○ | ○ |
| Comparative example | 18 | ○ | ○- | △ | △ | △ | △ | ○- | ○- | △ | △ | ○- | ○- |
| Comparative example | 19 | △ | △ | × | × | △ | △ | ○- | ○- | × | × | × | × |
| Example | 20 | ○ | ○- | ○- | ○- | ○ | ○ | ○ | ○ | ○- | ○- | ○- | ○- |
| Example | 21 | ○ | ⊚ | ⊚ | ⊚ | ○ | ○ | ○ | ○ | ⊚ | ⊚ | ⊚ | ⊚ |
| Example | 22 | ○ | ⊚ | ⊚ | ⊚ | ○ | ○ | ○ | ○ | ⊚ | ⊚ | ⊚ | ⊚ |
| Example | 23 | ○ | ⊚ | ⊚ | ⊚ | ○ | ○ | ○ | ○ | ⊚ | ⊚ | ⊚ | ⊚ |
| Example | 24 | ○ | ○ | ○- | ○ | ○ | ○ | ○ | ○ | ○ | ○ | ○ | ○ |
| Comparative example | 25 | ○ | △ | △ | △ | ○- | ○- | ○ | ○ | △ | △ | △ | △ |
| Comparative example | 26 | △ | × | × | × | △ | △ | △ | △ | × | × | × | × |
| Example | 27 | ○ | ○ | ○ | ○- | ○ | ○ | ○ | ○ | ○ | ○ | ○ | ○ |
| Example | 28 | ○ | ⊚ | ⊚ | ⊚ | ○ | ○ | ○ | ○ | ⊚ | ⊚ | ⊚ | ⊚ |
| Example | 29 | ○ | ○ | ○ | ○ | ○ | ○ | ○ | ○ | ○ | ○ | ○ | ○ |
| Comparative example | 30 | ○ | △ | △ | △ | △ | △ | ○- | ○- | × | △ | △ | △ |
| Comparative example | 31 | △ | × | × | × | △ | △ | ○- | ○- | × | × | × | × |

TABLES 13

| Example or Comparative example | No. | Film appearance | Corrosion resistance SST | Corrosion resistance CCT | Alkali resistance | Solvent resistance Appearance Ethanol | MEK | Hexane | Benzene | Solvent resistance Corrosion resistance Ethanol | MEK | Hexane | Benzene |
|---|---|---|---|---|---|---|---|---|---|---|---|---|---|
| Example | 32 | ○ | ◎ | ○ | ◎ | ○ | ○ | ○ | ○ | ◎ | ◎ | ◎ | ◎ |
| Example | 33 | ○ | ◎ | ◎ | ◎ | ○ | ○ | ○ | ○ | ◎ | ◎ | ◎ | ◎ |
| Example | 34 | ○ | ◎ | ◎ | ◎ | ○ | ○ | ○ | ○ | ◎ | ◎ | ◎ | ◎ |
| Example | 35 | ○ | ○ | ○- | ○- | ○ | ○ | ○ | ○ | ○- | ○- | ○- | ○- |
| Example | 36 | ○ | ◎ | ○ | ○ | ○ | ○ | ○ | ○ | ○ | ○ | ◎ | ◎ |
| Example | 37 | ○ | ◎ | ○ | ◎ | ○ | ○ | ○ | ○ | ◎ | ◎ | ◎ | ◎ |
| Comparative example | 38 | ○ | ○- | △ | △ | ○ | ○ | ○ | ○ | △ | △ | △ | △ |
| Example | 39 | ○ | ○ | ○- | ○- | ○- | ○- | ○- | ○- | ○- | ○- | ○- | ○- |
| Example | 40 | ○ | ○ | ○ | ○ | ○ | ○ | ○ | ○ | ○ | ○ | ○ | ○ |
| Example | 41 | ○ | ◎ | ○ | ◎ | ○ | ○ | ○ | ◎ | ◎ | ◎ | ◎ | ○ |
| Example | 42 | ○ | ○ | ○ | ○ | ○ | ○ | ○ | ○ | ○ | ○ | ○ | ○ |
| Example | 43 | ○ | ○ | ○ | ○ | ○ | ○ | ○ | ○ | ○ | ○ | ○ | ○ |
| Example | 44 | ○- | ○ | ○- | ○ | ○ | ○ | ○ | ○ | ○- | ○- | ○- | ○- |
| Comparative example | 45 | ○ | △ | X | X | X | △ | △ | △ | X | X | △ | △ |
| Comparative example | 46 | ○ | △ | △ | △ | ○ | △ | ○ | △ | △ | △ | △ | X |

INDUSTRIAL APPLICABILITY

While a surface-treated galvanized steel sheet according to the present invention contains no hexavalent chromium in its film, it has very excellent corrosion resistance and is also excellent in terms of the alkali resistance and the solvent resistance. Hence, a surface-treated galvanized steel sheet according to the present invention can find wide application as a surface-treated steel sheet in automobiles, household electrical appliances, and construction materials.

The invention claimed is:

1. A surface-treated galvanized steel sheet, comprising:
a steel sheet;
a zinc coating disposed on the steel sheet; and
a film disposed on the zinc coating, the film having a thickness in the range of 0.01 to 3 μm and containing a resin compound (A) represented by a general formula (I) and a cationic urethane resin (B) having a quaternary ammonium salt group at an A:B mass ratio of from 7:3 to 4:6, 2% to 20% by mass of vanadium compound (C), 2% to 20% by mass of zirconium compound (D), 5% to 30% by mass of compound (E) having a phosphate group, and 0.1% to 5% by mass of at least one acid compound (F) selected from the group consisting of hydrofluoric acid, acetic acid, nitric acid, sulfuric acid, and salts thereof, on the basis of the total amount of A and B, wherein said formula (I) is as follows:

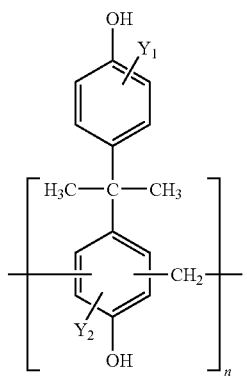

(I)

wherein $Y_1$ and $Y_2$ on benzene rings independently represent hydrogen or a Z group represented by a general formula (II) or a general formula (III), and the mean number of substituent Z groups per benzene ring is in the range of 0.2 to 1.0, n is an integer in the range of 2 to 50, wherein said formula (II) and said formula (III) are as follows:

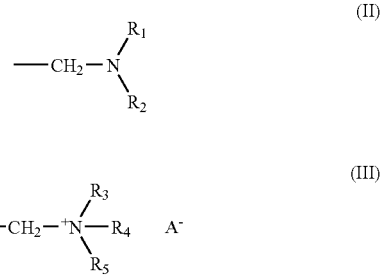

wherein $R_1$, $R_2$, $R_3$, $R_4$, and $R_5$ independently represent an hydrogen atom, an alkyl group having 1 to 10 carbon atoms, or a hydroxyalkyl group having 1 to 10 carbon atoms, and $A^-$ represents a hydroxide ion or an acid ion.

2. A method for manufacturing the surface-treated galvanized steel sheet according to claim 1, comprising: applying a surface treating agent to a galvanized steel sheet and drying the surface treating agent to form a film having a thickness in the range of 0.01 to 3 μm, wherein the film contains a resin compound (A) represented by a general formula (I) and a cationic urethane resin (B) having a quaternary ammonium salt group at an A:B mass ratio of from 7:3 to 4:6, and 2% to 20% by mass of vanadium compound (C), 2% to 20% by mass of zirconium compound (D), 5% to 30% by mass of compound (E) having a phosphate group, and 0.1% to 5% by mass of at least one acid compound (F) selected from the group consisting of hydrofluoric acid, acetic acid, nitric acid, sulfuric acid, and salts thereof, on the basis of the total amount of A and B, wherein said formula (I) is as follows:

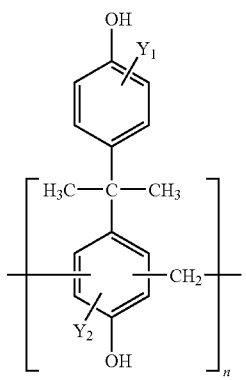

(I)

wherein $Y_1$ and $Y_2$ on benzene rings independently represent hydrogen or a Z group represented by a general formula (II) or a general formula (III), and the mean number of substituent Z groups per benzene ring is in the range of 0.2 to 1.0, n is an integer in the range of 2 to 50, wherein said formula (II) and said formula (III) are as follows:

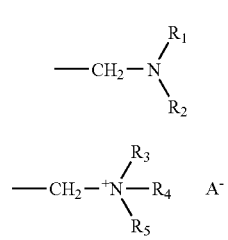

wherein $R_1$, $R_2$, $R_3$, $R_4$, and $R_5$ independently represent an hydrogen atom, an alkyl group having 1 to 10 carbon atoms, or a hydroxyalkyl group having 1 to 10 carbon atoms, and $A^-$ represents a hydroxide ion or an acid ion.

3. A surface-treated galvanized steel sheet comprising a surface-treated film having a thickness in the range of 0.01 to 3 μm, wherein the surface-treated film is formed by applying a surface treating agent to a galvanized steel sheet and drying the surface treating agent, the surface-treated film containing a resin compound (A) represented by a general formula (I), a cationic urethane resin (B) having a quaternary ammonium salt group, a vanadium compound (C), a zirconium compound (D), phosphoric acid or/and phosphate (E), and at least one acid compound (F) selected from the group consisting of hydrofluoric acid, acetic acid, nitric acid, sulfuric acid, and salts thereof, the ratio (A:B) of the resin compound (A) and the cationic urethane resin (B) being in the range of 7:3 to 4:6 on a solid basis, the vanadium compound (C) content being 2% to 20% by mass, the zirconium compound (D) content being 2% to 20% by mass, the phosphoric acid or/and phosphate (E) content being 5% to 30% by mass, the acid compound (F) content being 0.1% to 5% by mass, on the basis of the total solid content of the resin compound (A) and the cationic urethane resin (B), wherein said formula (I) is as follows:

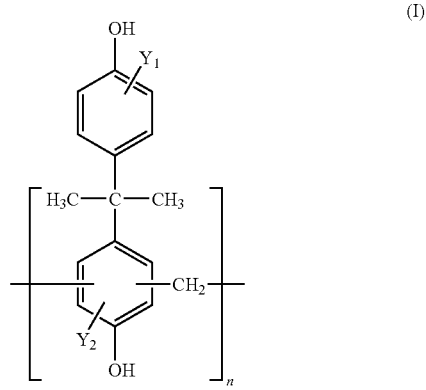

(I)

wherein $Y_1$ and $Y_2$ on benzene rings independently represent hydrogen or a Z group represented by a general formula (II) or a general formula (III), and the mean number of substituent Z groups per benzene ring is in the range of 0.2 to 1.0, n is an integer in the range of 2 to 50, said formula (II) and said formula (III) are as follows:

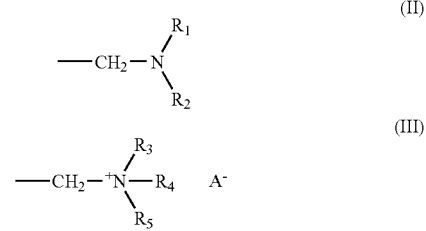

wherein $R_1$, $R_2$, $R_3$, $R_4$, and $R_5$ independently represent an hydrogen atom, an alkyl group having 1 to 10 carbon atoms, or a hydroxyalkyl group having 1 to 10 carbon atoms, and $A^-$ represents a hydroxide ion or an acid ion.

* * * * *